(12) United States Patent
Choi et al.

(10) Patent No.: US 9,177,091 B2
(45) Date of Patent: Nov. 3, 2015

(54) ROW FORMATION DURING DATAPATH PLACEMENT IN CIRCUIT DESIGN

(71) Applicant: Oracle International Corporation, Redwood City, CA (US)

(72) Inventors: Wonjoon Choi, Austin, TX (US); Akshay Sharma, Austin, TX (US); Huy Tran Ba Vo, Austin, TX (US); Guo Yu, Cedar Park, TX (US)

(73) Assignee: Oracle International Corporation, Redwood City, CA (US)

( * ) Notice: Subject to any disclaimer, the term of this patent is extended or adjusted under 35 U.S.C. 154(b) by 46 days.

(21) Appl. No.: 14/173,618

(22) Filed: Feb. 5, 2014

(65) Prior Publication Data
US 2015/0220673 A1 Aug. 6, 2015

(51) Int. Cl.
*G06F 17/50* (2006.01)

(52) U.S. Cl.
CPC .................................. *G06F 17/5054* (2013.01)

(58) Field of Classification Search
CPC ......................................................... G06F 17/50
USPC ........................................................ 716/102
See application file for complete search history.

(56) References Cited

U.S. PATENT DOCUMENTS 7,822,897 B2 * 10/2010 Mitra et al. ................... 710/104

OTHER PUBLICATIONS

Chan et al., "Multilevel Generalized Force-directed Method for Circuit Placement," *ISPD '05*, Apr. 3-6, 2005, San Francisco, California, 8 pages.

* cited by examiner

*Primary Examiner* — Thuan Do
(74) *Attorney, Agent, or Firm* — Polsinelli PC

(57) ABSTRACT

Implementations of the present disclosure involve methods and systems for component placement in a datapath block of a microelectronic circuit design. In particular, implementations provide for collecting groups of common components in the datapath block that form a row or partial row. A preliminary layout of the datapath block is performed with the component set rows and any other components of the datapath block design. Common components are then collected into groups or sets to form additional rows within the datapath layout, with at least some consideration to the wire lengths between components in the rows. By collecting common components into rows with consideration to the wire lengths between interconnected components, the timing performance of the datapath block may be improved.

17 Claims, 6 Drawing Sheets

ROW FORMATION DURING DATAPATH PLACEMENT IN CIRCUIT DESIGN

FIELD OF THE DISCLOSURE

Aspects of the present invention relate to computing systems and, more particularly, aspects of the present invention involve design of a very-large scale integration (VLSI) microelectronic circuit.

BACKGROUND

Computers or other executing devices are ubiquitous in today's society. They come in all different varieties and can be found in places such as automobiles, laptops or home personal computers, banks, personal digital assistants, cell phones, as well as many businesses. In addition, as computers become more commonplace and software becomes more complex, there is a need for the computing devices to perform faster and more reliably in smaller and smaller packages.

As the design of computing systems continues to increase in complexity, the design phase of the system becomes more difficult and time-consuming. For example, during design of an integrated circuit, such as a multi-core processor, several thousand logic elements are placed within the circuit design by a designer, typically by using a circuit design tool. Such logic elements may include different types of flip-flops, registers, adders, AND gates, NAND gates, multiplexers and the like. Those of ordinary skill in the art will recognize the various components that are typically included in a VLSI circuit design. Each of these components typically form blocks that are then placed within the design by the designer so that each block communicates with the other blocks in the design to create the functionality of the circuit. Some common circuit blocks include control blocks (blocks designed to provide control signals to other blocks within the circuit design) and datapath blocks (blocks that include computational components to perform computations on data within the circuit), among other types of blocks of circuit components.

The design of control blocks, including the placement of the components that comprise the control block, is typically done through the use of one or more placement or design tools. This is because the design of the control block is highly dependent on the desired functionality of the circuit being designed and comports with the timing constraints desired through the circuit design. Datapath blocks, on the other hand, are usually more routine in design since the components of the datapath block may be used to perform generic arithmetic and logical operations on the data used by the circuit. As such, placement tools for datapath blocks are not commonly used, but rather, the design of datapath blocks is typically performed manually by a designer of the circuit. However, such manual designs may take a considerable amount of time to complete. Further, designers generally do not attempt to optimize the placement of the components within the datapath block, although optimization of the placement of the components may increase the performance metrics of the circuit design.

It is with these and other issues in mind that various aspects of the present disclosure were developed.

SUMMARY

One implementation of the present disclosure may take the form of a method for design of a microelectronic circuit. The method may include the operations of obtaining, utilizing a processor, a netlist describing a functional block of a microelectronic circuit from a computer-readable medium, the netlist comprising a listing of a plurality of components of the functional block and at least one connection between a pair of components of the plurality of components and identifying at least one set of associated sequential components and at least one set of associated combinational components of the functional block from the plurality of components of the netlist. The method may further include assigning a unique identifier to each of the at least one set of associated sequential components, the least one set of associated combinational components and a plurality of remaining components from the plurality of components of the netlist, creating a hypergraph containing a plurality of unique identifiers, the hypergraph indicative of the at least one connection between the pair of components of the plurality of components, and organizing the plurality of components of the functional block into a plurality of rows based at least on the hypergraph within a footprint of the functional block Another implementation of the present disclosure may take the form of a design tool for the design of a microelectronic circuit, the design tool including a computer-readable medium for storing a netlist, the netlist comprising a listing of a plurality of components of a functional block of a microelectronic circuit and a plurality of connections between the plurality of components and a processor configured to obtain one or more executable instructions from the computer-readable medium. The processor is further configured to execute the one or more instructions to perform the operations of obtaining the netlist, identifying at least one set of storage components and at least one set of associated combinational components of the functional block from the plurality of components of the netlist and assigning a unique identifier to each of the at least one set of storage components, the least one set of associated combinational components and a plurality of remaining components from the plurality of components of the netlist. The one or more instructions also cause the processor to modify the netlist into a hypergraph, the hypergraph comprising a plurality of entries associated with the plurality of connections utilizing the unique identifiers, wherein at least one entry comprises at least one pair of unique identifiers indicating a connection between the pair of unique identifiers and locate the plurality of components of the functional block into a plurality of rows based at least on the plurality of connections in the hypergraph, the locating configured to place the components associated with the at least one pair of unique identifiers in adjacent rows.

Yet another implementation of the present disclosure may take the form of a non-transitory computer readable medium encoded with instructions for designing a portion of a microelectronic circuit, the instructions executable by a processor. The instructions comprise receiving a netlist describing the circuit portion, the netlist comprising a listing of a plurality of components of the circuit portion and at least one connection between a pair of components of the plurality of components, assigning a unique identifier to each of at least one set of associated sequential components of the circuit portion from the plurality of components of the netlist, at least one set of associated combinational components of the circuit portion from the plurality of components of the netlist and a plurality of remaining components from the plurality of components of the netlist, creating a hypergraph containing a plurality of unique identifiers, the hypergraph indicative of the at least one connection between the pair of components of the plurality of components, and organizing the plurality of components of the circuit portion into a plurality of rows based at least on the hypergraph within a footprint of the circuit portion.

DETAILED DESCRIPTION

Implementations of the present disclosure involve methods and systems for component placement in a circuit block of a microelectronic circuit design. In particular, the implementations described provide for collecting groups of common components in a datapath block of the circuit that form a row or partial row. For example, a group of components may be an associated set of flip-flop or other storage devices that form a row of components within the datapath block. These set of components are located in the layout of the datapath block as completed rows. Next, a preliminary layout of the datapath block is performed with the complete rows of sets of components and any other components of the datapath block design based at least on the connectivity between the components. Common components with similar locations within the design are then collected into groups or sets to form additional rows within the datapath layout. By collecting common components into rows with consideration to the connectivity between interconnected components, the timing performance of the datapath block may be improved. Further, the process of row formation described herein may be reiterated several times until a preferred datapath block design is achieved that incorporates short wire length between interconnected components. In this manner, the design and placement of the components of the datapath block may be determined during the design phase of the microelectronic circuit.

Figure 1:
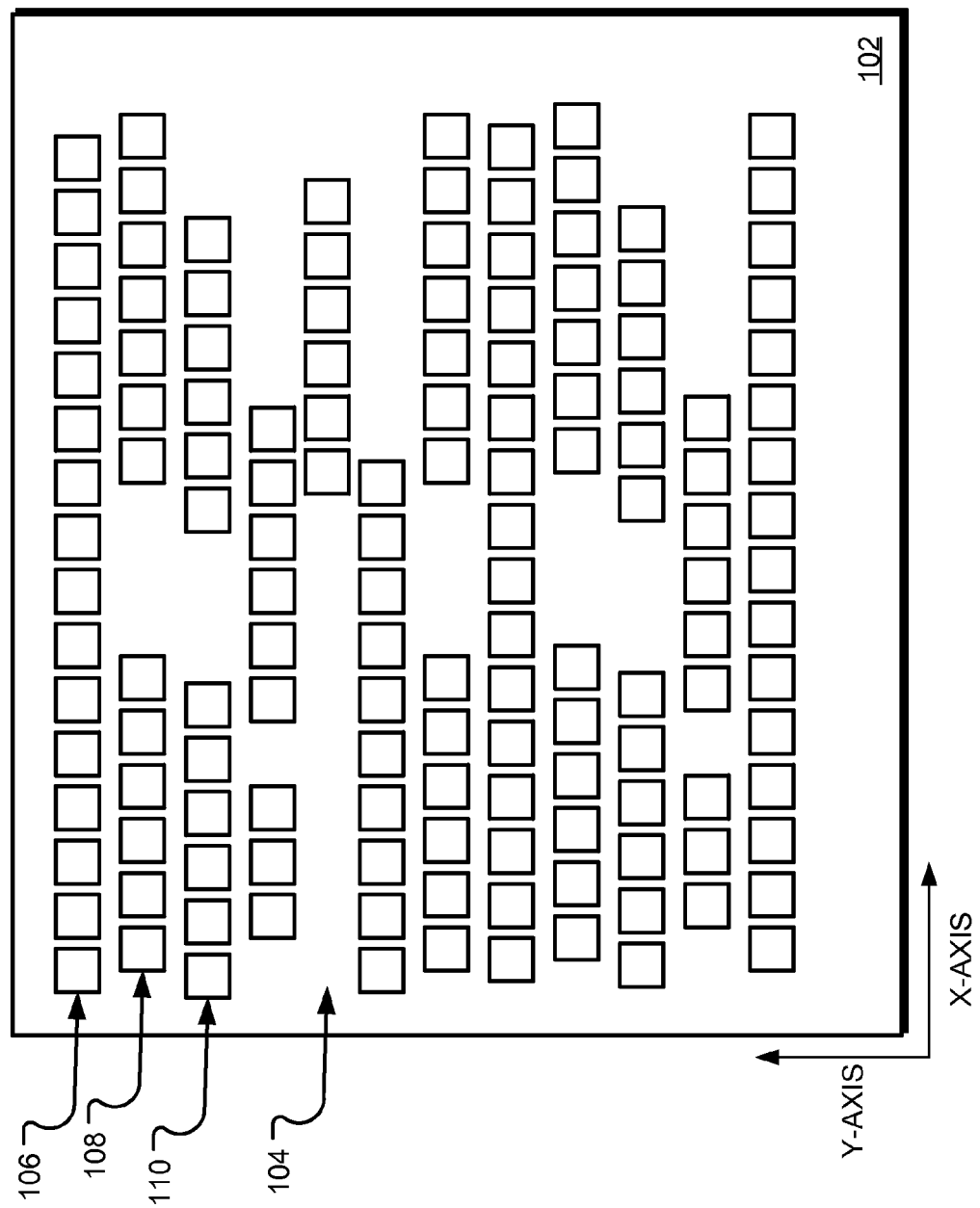
FIG. 1 is a schematic diagram illustrating a top-down view of an example of a datapath block of a microelectronic design.

FIG. 1 illustrates a schematic diagram of a top-down view of an example of a datapath block of a microelectronic design. As described above, a microelectronic circuit, such as a multi-threaded processor, comprises multiple blocks of functionality, with each block comprising several electronic components. Each block performs some function for the circuit and, through an interconnection of the blocks of the design, the functionality of the microelectronic circuit is achieved. Thus, the datapath block 102 of FIG. 1 is an example of a datapath-type block of such a multi-block microelectronic circuit. The datapath block 102 of FIG. 1 includes multiple components 104, illustrated as squares within the footprint of the datapath block of FIG. 1. The components 104 may include any type of logical or functional components of a microelectronic circuit, including flip-flops, registers, adders, AND gates, NAND gates, multiplexers and the like. In addition, although not shown in FIG. 1, the various components 104 of the datapath block 102 may be interconnected through one or more wires between the components. The interconnections between the components 104 of the datapath block 102 allow for the propagation of signals through the various components such that the functionality of the datapath block may be realized.

In addition, one or more of the components 104 of the datapath block 102 may be connected to other types of blocks of the circuit. For example, a component 104 of the datapath block 102 may receive a control signal from another block of the microelectronic circuit to enable or disable the component. In another example, data from multiple data lines may be provided to the datapath block 102 from another block of the circuit design such that computations may be performed on the data. As should be appreciated by those in the art, the interconnection of the components 104 within the datapath block 102 and/or with components of other functional blocks of the circuit provides the functionality of the datapath block 102 for the overall circuit design.

As shown in the embodiment of FIG. 1, the components 104 of the block 102 may be arranged in a series of rows of components. Although it is not required that the components form such rows, an arrangement of the components 104 into rows may facilitate an ordered collection of the components for ease of interconnection. Further, by placing the components 104 in rows, wire lengths between interconnected components may be shortened or lessened over other arrangement styles of the components within the block 102. Thus, the components 104 of the block 102 of FIG. 1 are arranged in rows, such as rows 106-110. Each row 106-110 may include any number of components 104 that will fit along a horizontal axis of the footprint of the block 102. In other words, the number of components 104 within any one row may be limited by the footprint size of the datapath block 102. Also, as explained in more detail below, the components 104 within a particular row 106-110 may be similar in function, size, type, and the like to provide additional order to the block design.

For the purposes of the present disclosure, locations of components within the block 102 footprint may be referenced as having an horizontal position (or an X-axis position) and a vertical position (or a Y-axis position) relative to the bottom-left corner of the block footprint. However, the use of coordinates to identify locations within the block 102 is arbitrary. For example, locations within the block 102 may be referenced from any position, either within the block or within the microelectronic circuit itself. Further, the identifier used to identify a location within the block 102 may take any form, not just coordinate values. However, for ease of understanding in this disclosure, component locations within the datapath block 102 is referenced through an X-axis value and Y-axis value relative to the bottom-left corner of the block footprint.

As mentioned above, it is common for the placement of the components 104 within the datapath block 102 to be determined manually by a designer of the block. In other words, the designer, using a circuit design program or tool, selects positions within the datapath block 102 for placement of each of the components 104 of the block. These selected positions may or may not create rows 106-110 within the block footprint. Further, such positions may not account for wire lengths between interconnected components 104 of the design such that the design may suffer timing delays due to unnecessarily long transmission paths through the block. In contrast, the flowchart of FIG. 2 describes a method for row formation of components during the design of the datapath block that may be performed automatically to reduce the amount of time for designing the block 102. In addition, the method may take into account the interconnectivity of the components 104 within the block to reduce or minimize the wire lengths present within the block design.

In general, the operations of the flowchart of FIG. 2 may be performed by a computer or other processing device, as described in more detail below in relation to FIG. 5. For example, a circuit design program or tool may be utilized to perform the operations of FIG. 2 automatically in response to receiving a netlist describing the circuit block. In another embodiment, the design program or tool may interact with one or more commands provided from a circuit designer to perform the operations described herein. The design tool may be comprised of software components, hardware components, or a combination of both hardware and software components.

Beginning in operation 202, the design tool identifies groups or sets of similar components that may be considered as a complete row in the footprint of the datapath block. In general, the inclusion of a component in a complete row is based on the type of the component. The type of the component may be obtained through a netlist or other type of description of the datapath block generated during the design phase of the microelectronic circuit. Some examples of a netlist that includes component and connection information for a datapath design include a structural Verilog file and/or a Library Exchange Format (LEF) library file, among others. For example, flip-flop components of the block are labeled as flip-flop type devices in a netlist describing the block. However, as discussed in more detail below, other components that are related and of the same type may also combined to form complete rows.

Flip-flop components or latches are often referred to as "sequential" components. Such sequential components are often grouped into sets based on the design of the microelectronic circuit. For example, a circuit that utilizes a 64-bit data path may use 64 sequential components to store the state of each bit of the data path at a particular point in the sequential processing of the data. In other words, 64 sequential storage components may be grouped together to store the 64 bits of the data path. Thus, in the datapath design, the 64 flip-flops or latches that form a storage point in the processing of the data may be collected into a set and organized into a row in the datapath block. In a microelectronic circuit that uses a 32 bit data path, 32 sequential storage elements may be collected into a set and organized into a row in the block. In general, any group of sequential storage components or elements that form a storage point in the processing of the data of the microelectronic circuit may be formed into a row in the datapath block.

Similarly, other types of components may also be collected and formed into a row of the block. For example, another type of component is a "combinational" component. Combinational components are components that are utilized by a circuit to perform some computation on an input to the component. Combinational components may include logic gates (such as AND, NAND and OR gates), adders, multiplexers and the like. Typically, the output of the sequential components are provided to combinational components as an input. Thus, a common data flow of a circuit includes a data signal that is stored in one or more sequential components that is then output to one or more combinational components for computations on the data. The interconnection the components of a datapath block is discussed in more detail below with reference to FIG. 3.

Returning to FIG. 2, a group or set of combinational components may also be identified and formed into a complete row in operation 204. However, unlike the group of sequential components described above, combinational components that are related and can be collected into a completed row may not be easily identifiable from the netlist of the circuit. Thus, the design tool may identify sets of associated combinational components that may be grouped into a row in other ways. For example, one type of an associated group of combinational components is an adder carry chain or carry-lookahead adder. These types of adder circuits pass a carry bit to a subsequent adder component such that the adder components in the chain are interconnected to form the adder carry chain. The adder components that form an adder carry chain can typically be identified from the netlist of the design as a complete adder carry chain. Thus, after the design tool identifies a group of adder components as forming an adder carry chain, the adder components may then be collected into a complete row by the program in operation 204.

Another type of combinational components that may be collected into a complete row in operation 204 are components that share the same enable signal and are of the same component type. As mentioned above, the type of a component may be obtained from the netlist of the block design. Further, components that are connected by the same control signal may also be easily obtained from the netlist of the circuit. Thus, when a group or set of such components are identified, the program may associate the components to a row of similar components. Such rows may be referred to herein as high-fanout-net (HFN) rows. One example of such a row of components may be a group of AND logic gates that have a common control signal to enable to the components.

Figure 2:
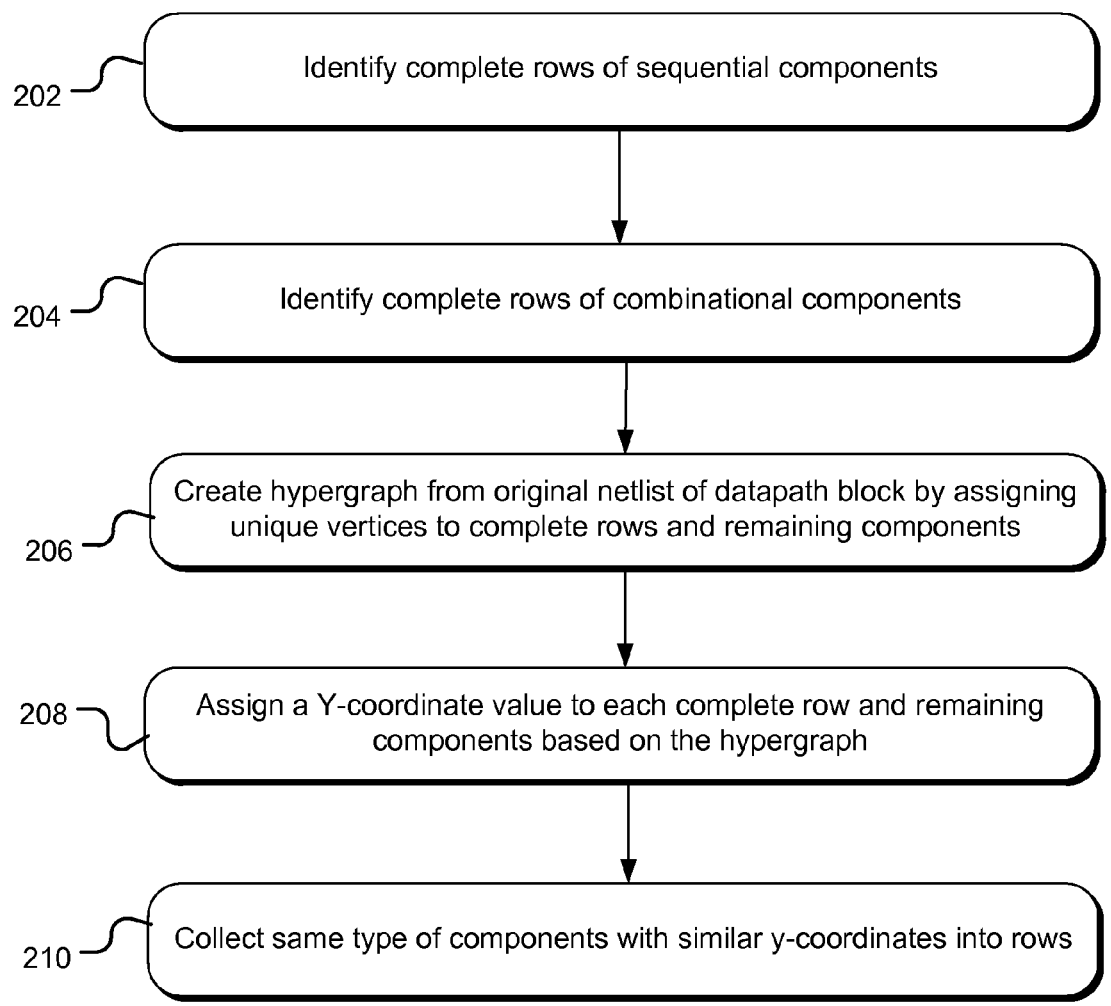
FIG. 2 is a flowchart of a method for row formation during design of a datapath block of a microelectronic design.

Through operations 202 and 204 of FIG. 2, one or more complete rows of components are identified for placement within the datapath block of the microelectronic circuit. In particular, the program identifies complete rows of sequential components (such as flip-flop, latches or other storage components) and complete rows of combinational components (such as adder carry chains and groups of the same type of components controlled by the same enable signal or signals). However, other components of the datapath block design may not qualify for inclusion within these identified completed rows. Thus, the design tool may perform operations 206-210 to identify and place the remaining components into one or more rows of the datapath block design.

Figure 3:
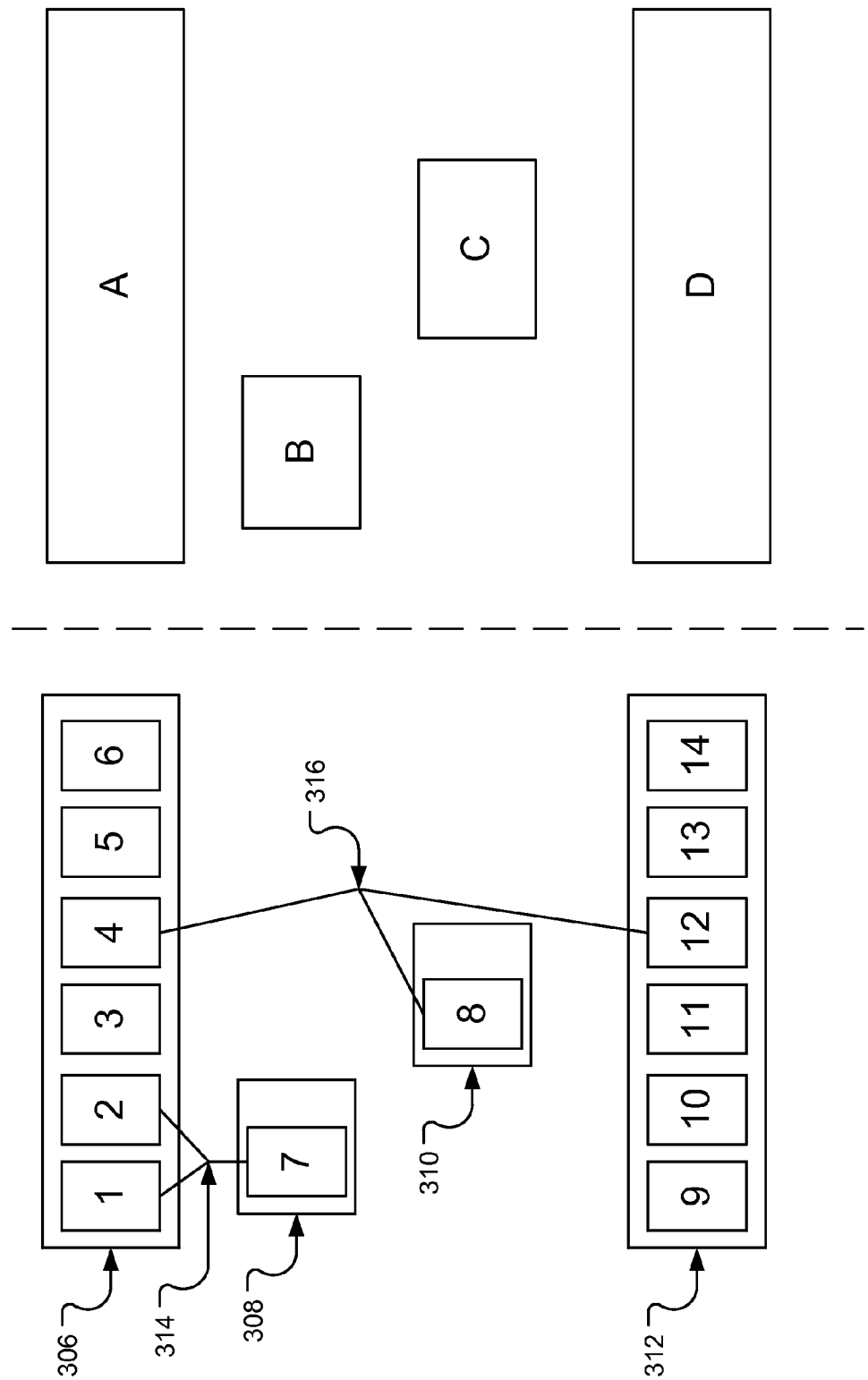
FIG. 3 is a schematic diagram illustrating a top-down view of example rows of a datapath block design and the assignment of identifiers to the rows of the datapath block.

In operation 206, the program transforms the netlist of the block design into a hypergraph that uses unique identifiers assigned to the completed rows and the remaining components to summarize the interconnectivity between the components of the block design. In particular, each completed row identified in operations 202 and 204 above are assigned a unique identifier that is associated with each component within the completed row. To describe the creation of the hypergraph, reference is made to the footprint of a datapath block in FIG. 3. The schematic of FIG. 3 is a visual representation of the connectivity of a datapath block of a microelectronic circuit acquired from a netlist of the block. Thus, the footprint includes rows of components 306-312 and one or more interconnections 314, 316 between a plurality of the components. As explained in more detail below, this interconnection may be obtained from the netlist of the datapath block design. Further, it should be appreciated that the visual representation of the connectivity between the components is not necessarily the orientation of the components in the final design of the datapath block. Rather, the illustration of FIG. 3 is provided as a visual example of the interconnectivity of the components of the datapath block to aid in generating the hypergraph based on the netlist of the circuit.

As shown in FIG. 3, row 306 and row 312 represent complete rows obtained in operations 202 and 204 described above. Thus, row 306 may be components 1-6 that form a carry adder chain while row 312 may be a row of sequential storage components, such as a group of latches designated components 9-14. In operation 206, such completed rows are assigned an identifier by the design tool. The assignment of the identifier to the completed rows is illustrated in FIG. 3 as the right-side of the figure. Thus, in the example shown, row 306 is assigned identifier "A", while row 312 is assigned identifier "D".

As also described above, some components of the datapath block design may not be included in a completed row. Such components are illustrated in FIG. 3 as component 7 in row 308 and component 8 in row 310. The individual components of the datapath block design are also provided an identifier in operation 206, similar to the identifiers assigned to the completed rows. Thus, as shown in FIG. 3, row 308 (or component 7) is given an identifier of "B" and row 310 (or component 8) is given an identifier of "C". As explained below, these identifiers are utilized to generate the hypergraph of the netlist of the datapath block. Thus, each completed row and component of the block not assigned to a completed row is associated with an identifier in a similar manner. Although the identifiers used herein are letters, it should be appreciated that the identifier may take any form that is recognizable by the design tool and are generally unique to each row or remaining component.

The schematic of the datapath block of FIG. 3 also includes one or more interconnections 314, 316 between the components of the circuit. In general, the interconnections between the components of the circuit are obtained from the netlist describing the datapath block circuit. For example, a netlist for the example circuit of FIG. 3 may take the form of:

TABLE 1

| Netlist |
|---|
| 1, 2, 7 |
| 4, 8, 12 |
| 3, 4, 5 |

This netlist of the connections of the datapath block of FIG. 3 describes an interconnection between components 1, 2, and 7 (illustrated in FIG. 3 as interconnect 314) and an interconnection between components 4, 8, and 12 (illustrated in FIG. 3 as interconnect 316). Further, the netlist describes an interconnection between components 3, 4, and 5. This particular connection is not illustrated in FIG. 3, however, as components 3, 4, and 5 are already included in completed row 306. Thus, the connection between components 3, 4, and 5 has already been recognized and considered in operation 204 as these components form part of the adder carry chain circuit. The netlist of Table 1 is but a simplified example of the types of connections included in a netlist of a circuit design. In general, the netlist may include several thousand such connection descriptions for the components of the datapath block design. Further, the entries of the netlist may take any form that is recognizable by the design tool to determine the interconnectivity of the components of the datapath block circuit design.

To create a hypergraph of the netlist, the entries in the netlist that describe the interconnection of the components are replaced using the identifiers assigned to the completed rows and/or remaining components of the circuit. Thus, the hypergraph of the example netlist in Table 1 above may take the form of:

TABLE 2

| Hypergraph |
|---|
| A, B |
| A, C, D |
| . . . |

As shown in Table 2, the hypergraph does not include interconnections between components as in the netlist. Rather, the hypergraph uses the identifiers assigned to each completed row or individual components to simplify the entries in the hypergraph. For example, the netlist above in Table 1 includes a connection of components 1, 2, and 7. However, components 1 and 2 are components in an identified completed row of the circuit. As shown in FIG. 3, components 1 and 2 are included in completed row 306. Further, row 306 is assigned an identifier to indicate the row and the components within the row, in this case the identifier of the row is "A". Similarly, component 7 is in row 308 in FIG. 3, which is assigned the identifier "B". Thus, the entry in the netlist for components 1 and 2 is replaced by the identifier for that row 306 ("A") and component 7 is replaced by the identifier for that row 308, in this case "B". As a result, the netlist entry for the connection of components 1, 2, and 7 is reduced to the hypergraph entry of a described connection between identifiers A and B. In a similar manner, the entry for the connection of components 4, 8, and 12 is replaced by an entry describing a connection between rows A, C, and D. Also, as shown in FIG. 3, components 3, 4, and 5 are located within the same completed row. However, the netlist entry that describes the connection of those components would not have an associated hypergraph entry as each of those components are in the same row. The hypergraph, on the other hand, includes entries for connections between rows of components. In this manner, the hypergraph of the netlist of the datapath block provides interconnectivity information not between the components of the block, but between the completed rows and the remaining components of the block as obtained in operations 202 and 204.

With the hypergraph generated in operation 206, the program or design tool assigns a Y-coordinate value to each completed row and remaining component with consideration to the hypergraph entries in operation 208. In general, any analytical placement technique for placing components into a block footprint may be utilized to determine a Y-coordinate value for each row. In one embodiment, a force directed placement technique is used to determine a Y-coordinate value for each row. For example, utilizing the hypergraph example of Table 2 above, the program may utilize the force directed placement technique to note that completed row A (row 306 in FIG. 3) is connected to row B 308 and row C 310. Further, because row B 308 and row C 310 include components that are not included in other completed rows, row B and row C may be placed near completed row A 306 to minimize the wire lengths between row A and rows B and C. More particularly, the design tool assigns a Y-coordinate value to each completed row or component not in a completed row of the datapath block. As mentioned above, a Y-coordinate value is in relation to a common reference point on the footprint of the datapath block, such as the lower-left corner of the footprint. In general, any location indicator may be used to organize and orient the rows in the datapath block design.

The Y-coordinate is assigned to each completed row and/or component based in part on the hypergraph of the datapath block design to minimize the wire length between the rows and remaining components. Using FIG. 3 as an example, the program may note that row 310 is located between row 306 and row 312 based on the hypergraph entry that describes the connection between rows A, C, and D. Thus, row 312 is given a Y-coordinate value that places the row between the Y-coordinate values of row 306 and row 312. Similarly, the hypergraph includes an entry that indicates that row 308 is connected to row 306 such that row 308 is assigned a Y-coordinate near row 306 to minimize the wire length between the rows. In general, because of the structural nature of datapath netlists, closely related components tend to have similar Y-coordinate values in a one dimensional placement to maintain the bit string size of the data string utilized by the datapath block. Thus, each bit of an example 32-bit data string utilized by the datapath block tends to organize the components associated with each bit into collections of common components around similar Y-coordinate values when determined through a typical analytical placement technique for placing components into a data block.

As should be appreciated, typical placement tools place components into a datapath block footprint by determining the components two-dimensional location, such as an X-coordinate and a Y-coordinate. The technique disclosed herein and used in operation 208, in contrast, determines a one-dimensional location (such as a Y-coordinate) prior to determining the second dimensional location within the footprint. Completed rows of components may be provided with unique Y-coordinate values to prevent overlap of completed rows, but rows that include less than a completed row of components may share Y-coordinate values. The program or design tool may be configured to consider the number of components assigned a particular Y-coordinate value to ensure that the components in any one Y-coordinate does not exceed the limitation of the datapath block footprint.

As a result of assigning a Y-coordinate value to components based on connectivity information about the components, components with similar connectivity within the design are assigned similar Y-coordinate values. Thus, in operation 210 of FIG. 2, the design tool collects components that are of the same type and have similar Y-coordinate values into a set of components to form one or more rows of similar components. Operation 210 can best be understood with reference to FIG. 4.

Figure 4:
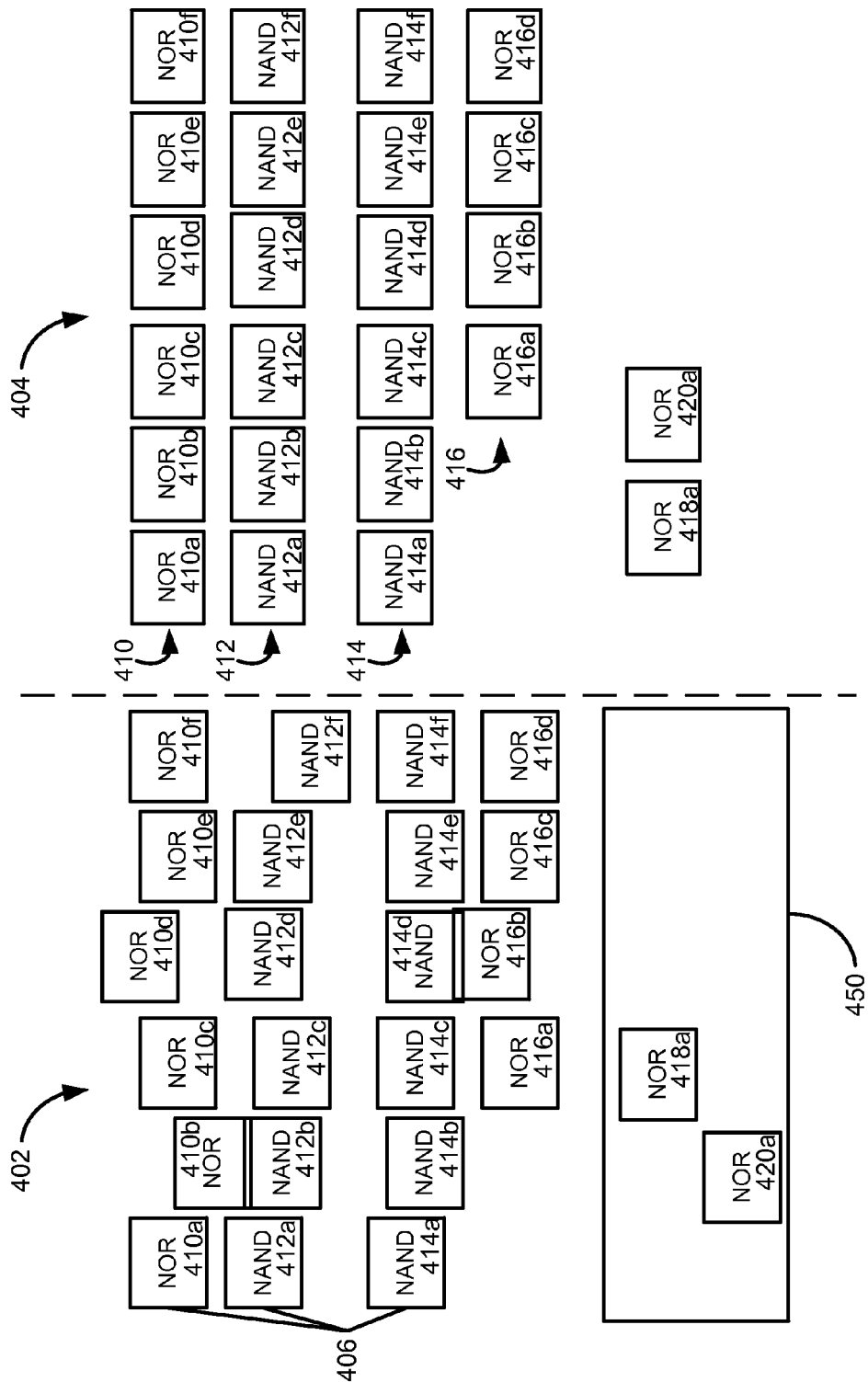
FIG. 4 is a schematic diagram illustrating a top-down view of clustering of similar components into rows of the datapath block.

FIG. 4 is a schematic diagram illustrating a top-down view of clustering of similar components into rows of the datapath block. In particular, the left side of the schematic illustrates placement of components within a datapath block footprint based on the assigned Y-coordinate value and the right side of the schematic illustrates those same components after a clustering operation has been performed on the placement. Thus, schematic 402 is one possible illustration of components based on placement using an analytical placement technique discussed above with relation to operation 208 and schematic 404 illustrates those same components after the operation 210 of clustering common components is applied. In general, however, it should be noted that while the illustration shows both an X and Y-coordinate for the components (so that the components can be illustrated in the Figure), the technique described herein may only assign a Y-coordinate to each component. Thus, any X-coordinate location shown for any component is arbitrary in FIG. 4.

As shown in schematic 402, several components 406 are illustrated. These components are some components of a datapath block design, used here for example purposes. Further, although shown as including NAND-type components and NOR-type components, it should be appreciated that other types of components for use in a datapath block design may also be present. As also illustrated, each component 406 has a Y-coordinate value or vertical placement within the schematic. The Y-coordinate value for each component 406 may be assigned to each of the components through the operations described above with relation to FIG. 2. As shown and is typical when utilizing an analytical placement technique to obtain a Y-coordinate for the components, components of similar types are given similar (but not typically identical) Y-coordinate values. This is due to the consideration and minimization of wire lengths between connected components within the datapath block design.

As groups of similar components are assigned similar Y-coordinate values, these components are given similar identifiers. Thus, schematic 402 includes NOR components 410a-410f, NAND components 412a-f, NAND components 414a-f, NOR components 416a-d and NAND components 418a and 420a. As shown, similar types of components are arranged partially into rows based on the analytical placement technique described above. However, as also shown, the components 406 for any one partial row may have varying Y-coordinate values. Thus, in operation 210, the system may collect similar types of components that have similar Y-coordinate values to obtain completed rows within the datapath block design.

To begin collecting components into rows, a clustering window is determined by the system. In general, the clustering window defines a distance from a particular component such that components that have a Y-coordinate value within the allowed distance may be combined into a collected row. One such clustering window is illustrated in schematic 402 as clustering window 450. The clustering window 450 may be of any size as desired by the system or datapath block designer. A larger clustering window (or allowed Y-coordinate distance) may collect more similar-types of components and a smaller clustering window may collect fewer similar-types of components into a row. In one embodiment, the clustering window 450 is one tenth of the vertical length of the datapath block footprint.

For each component 406, the system utilizes the defined clustering window 450 to determine other similar type of components that fall within the parameters of the window. In particular, because the system considers one-dimension (or the Y-coordinate value) of the component location, the clustering window analysis may determine similar type of components that are located within the distance along that dimension for each component corresponding to the clustering window. For example, a clustering analysis is performed for the components of FIG. 4. Through the clustering analysis, similar components (such as NOR components 410a-f) may be identified by the system as having a Y-coordinate that is within the clustering window 450.

In particular, the system may first determine the Y-coordinate value for each of the similar components at issue or in the datapath block design. Once determined, the system then collects other similar-type components (other NOR components) that have a Y-coordinate value that fall within the clustering window. For example, the distance along the Y-axis between neighboring components 410a-f along the Y-axis of the design is determined. The shortest distance between components 410a-f is analyzed to determine if the distance falls within the defined cluster window 450 size. For example, the system may determine that the Y-coordinate value for NOR component 410e and NOR component 410f is the shortest measured distance between any two neighboring components and falls within the clustering window 450 size. Thus, because these components are within the clustering window size and are of the same type of components, these components may be grouped together into a row of similar components.

Continuing the above example, the next shortest distances along the Y-axis between neighboring components is analyzed. For example, the system may determine that the Y-coordinate value for NOR component 410c and NOR component 410d is the next shortest measured distance between any two neighboring components and also falls within the clustering window 450 size. Thus, because these components are within the clustering window size and are of the same type of components, these components may be grouped together into another row of similar components. At this point, the system has identified two partial rows of similar components, NOR components 410c and 410d and NOR components 410e and 410f. Additional components may be added to the partially formed rows as the system continues to analyze the distance between neighboring components if the distance between the components falls within the defined clustering window 450 size.

There are generally two limits to the number of similar components that may be collected into a row. One such limit is when the distance between two components falls outside the clustering window size. For example, NOR component 410a-f may be identified as falling within the clustering window size, while the Y-coordinate value for NOR components 416a-d may be too far removed from NOR components 410a-f along the Y-axis to be included in the grouping. Second, the number of components collected within a row be limited by the row size. Because the clustering of the components is utilized to form rows of components in the datapath block, the clustering window 450 may be limited to include only a number of components that will fit within one row of the datapath block footprint. For example, the system may determine that NAND components 414a-f may fall within the clustering window size for NAND components 412a-f. However, because row 412 already has a full complement of components for that row, NAND components 414a-f may not be collected into a row with the components of row 412. Further iterations of the above operations with a larger cluster window 450 size may collect more components into rows and minimize the empty space presented during component clustering.

Once the components of similar type are collected into a group through the clustering window, the system may assign a new Y-coordinate value to each collected component to create a row of similar type components. For example, each of the components 410a-f may be assigned a Y-coordinate value to form a row. This is illustrated in schematic 404 as row 410. Further, the above operations may be performed for the other components 406 of the schematic 402 to form rows 412-416. In this manner, components of similar type and similar Y-coordinate values of schematic 402 are arranged into rows for placement within the datapath block design, as in schematic 404 and the hypergraph is updated accordingly.

As mentioned above, the system is concerned with placement of the components in one-dimension. Thus, an X-coordinate value may not be assigned to the components during this phase of the design. Rather, the system assigns a common Y-coordinate value to the collected components. As such, the group of components may be considered a row as each component will have the same Y-coordinate value. This is further illustrated in the collection of NOR component 418a and NOR component 420a. Through the operations described above, NOR component 420a is identified as being near NOR component 418a and of the same type. However, the system only assigns the same Y-coordinate value to these components without regard to a possible X-coordinate placement. Through further iterations of the operations described herein and/or adjustment of the clustering window 450, NOR component 418a and NOR component 420a may be collected into row 416 of schematic 404 to form a complete row of similar type components.

In addition, the operations described above may be altered to collect components of non-similar type into a row. Using schematic 404 as an example, the system may determine that no additional NOR components are located near enough to row 416 to be included in the row. Further, the system may note that the row is incomplete or does not include the maximum number of components that will fit within a row of the datapath block footprint. In this case, the system may collect NAND components into row 416, even though the rest of the row consists of NOR components. This may be done through a larger clustering window to limit the number of empty spaces in the datapath block footprint and the maximize the number of components that may fit within the design.

Figure 5:
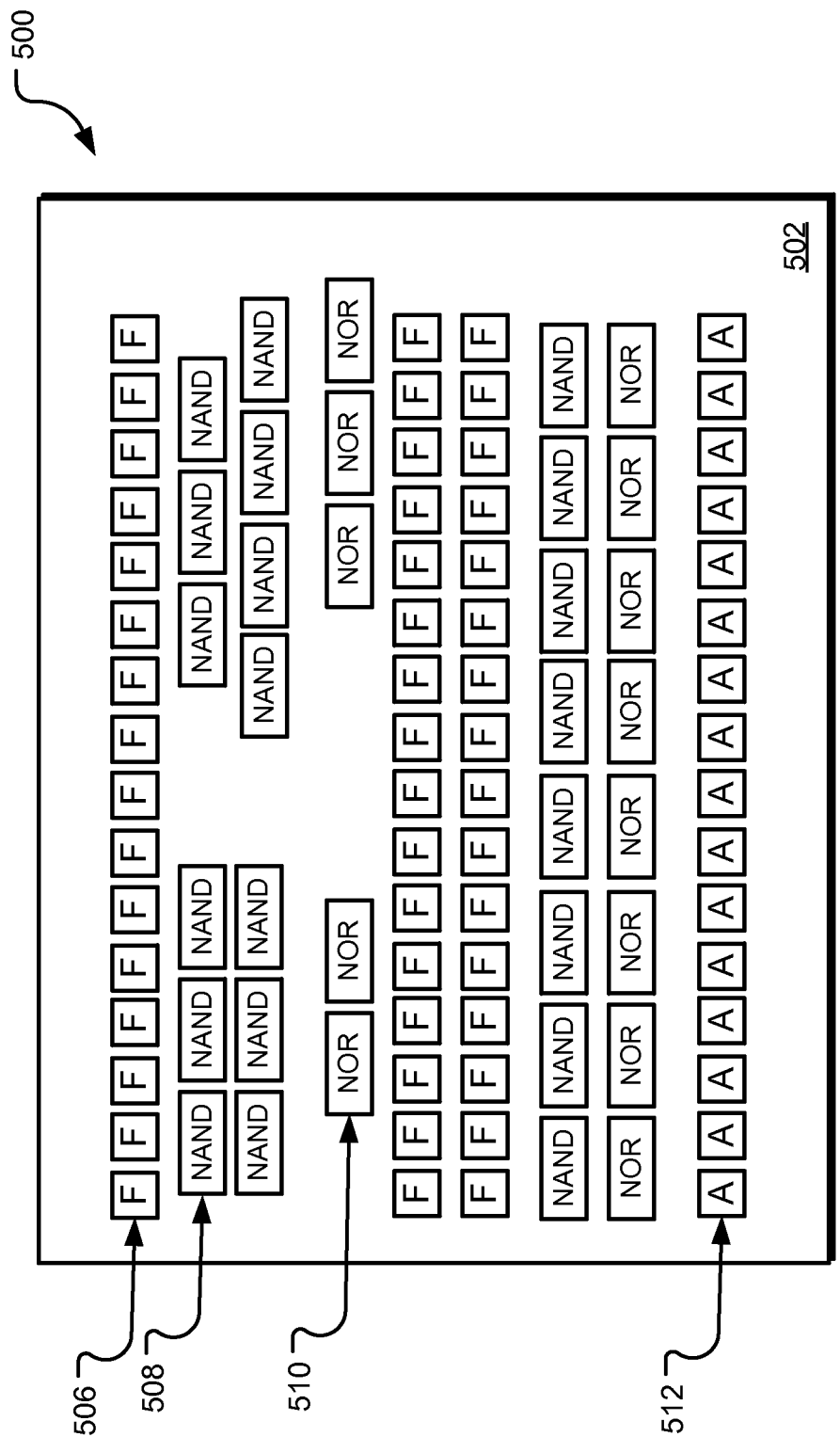
FIG. 5 is a schematic diagram illustrating a top-down view of an example of a datapath block of a microelectronic design organized through the method of FIG. 2.

FIG. 5 is a schematic diagram illustrating a top-down view of an example of a datapath block of a microelectronic design organized through the operations described herein. As shown in FIG. 5, components of similar type are collected into rows, such as a row of flip-flop storage components (row 506), a row of NAND logic components (row 508), a row of NOR logic components (row 510) and a row of an adder carry chain components (row 512), among others. Further, as shown in the schematic of FIG. 5, each component is provided with a horizontal or X-axis coordinate value in addition to the Y-coordinate value assigned for each row of components using force directed placement in the horizontal direction in a way to remove overlaps between components in the same row. Thus, the layout illustrated in FIG. 5 may be a footprint for the components of the datapath block design after the components have been arranged into one or more rows through the operations described herein.

The schematic 500 of FIG. 5 in particular illustrates a datapath block design 502 that includes rows of components of the design, similar to the block design of FIG. 1. However, the schematic 500 of FIG. 5 includes an indicator of the type of components within the circuit. For example, row 506 is a row of flip-flop storage components, designated by the letter "F". Other components illustrated in FIG. 5 include NAND logical gates (row 508), NOR logical gates (row 510) and adder carry chain components (row 512). As mentioned, the operations described herein provide for groups of the same type of components to be collected into a row, as shown. Thus, row 506 is a set of flip-flop storage devices that form a completed row identified in operation 202 of FIG. 2 above. Similarly, row 512 is a set of adder carry chain components that form a completed row identified in operations 204 of FIG. 2.

Row 508 is a collection of NAND logical components and row 510 is a collection of NOR logical components that do not belong to a identified completed row of components, but are rather collected through operations 206-210 of FIG. 2. In particular, these components are associated with a Y-coordinate value based on the generated hypergraph described above such that the wire length between connected components is minimized or otherwise considered. In operation 210, components of similar type with similar Y-coordinate values are gathered into rows. Thus, NAND components with similar Y-coordinates may be collected into row 508 of FIG. 5 and NOR components with similar Y-coordinates may be collected into row 510. In one embodiment, the collection of similar type of components is performed by collecting Y-coordinate values between the same type or similar type of components that are less than some threshold value. In one particular embodiment, the threshold value for collecting similar components into a group is the width of the datapath block footprint to prevent the row from being larger than the available space in the datapath block. In this manner, the components of the datapath block are collected into rows of similar type with regard to the interconnectivity of the components to improve the performance of the overall datapath circuit design.

Although not illustrated in FIG. 5, it should be appreciated that the components are also interconnected based on the netlist of the datapath block design. Further, because the Y-coordinates of the components is based on the hypergraph of the netlist of the design, wire lengths between the components may be minimized. However, it is not necessary that components only connect to components in the next or previous row. Rather, components within the design may connect to any number of other components in any other row of the design. Through the operations described herein, though, the length of some connections are minimized as the Y-coordinate placement of some components places those components near the rows to which the component interconnects.

In addition, the Y-coordinate value given to each row or component is assigned while considering only the placement of each component in one-dimension, namely the vertical position. After determination of the Y-coordinate value, the components may then be arranged in the X-coordinate by the system. Further, the above operations may be performed through multiple iterations to refine the design and collect more similar type of components into the rows. For example, a first iteration of the operations may collect a few similar type of components based on interconnection between the components. Further iterations may locate similar type of components near the identified collected of components such that the similar type of components may also be collected. The further refinement may also further minimize the wire lengths of some connections within the datapath block design to further improve the performance of the datapath block circuit. Thus, through the system and operations provided herein, a datapath block circuit design may be achieved through an automatic process that optimizes the performance of the datapath block circuit.

Figure 6:
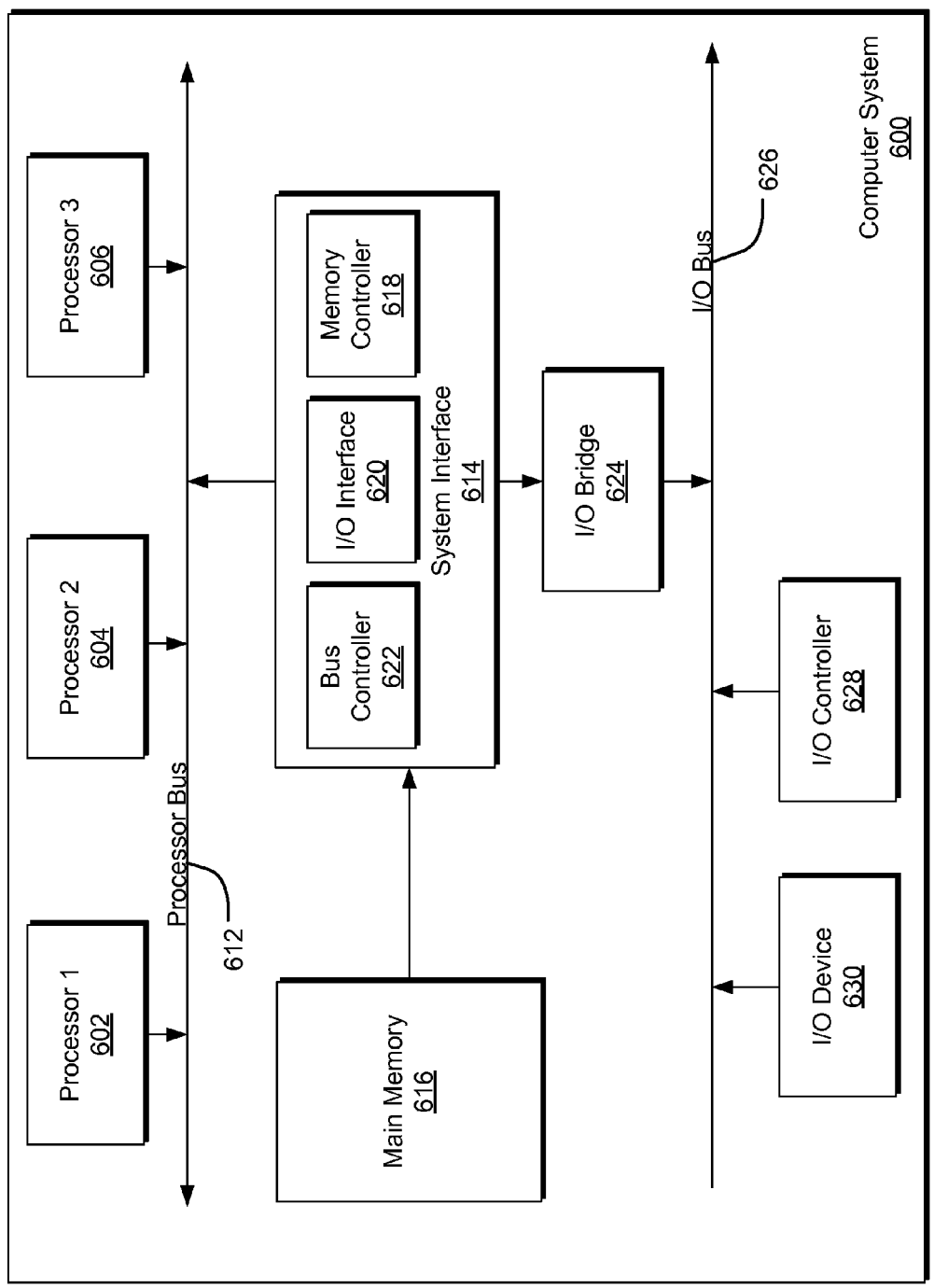
FIG. 6 is an example computing system that may implement various systems and methods discussed herein.

FIG. 6 is a block diagram illustrating an example of a computing device or computer system 600 which may be used in implementing the embodiments of the present disclosure. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 613 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof

What is claimed is:

1. A method for design of a microelectronic circuit, the method comprising:
   obtaining, utilizing a processor, a netlist describing a functional block of a microelectronic circuit from a computer-readable medium, the netlist comprising a listing of a plurality of components of the functional block and at least one connection between a pair of components of the plurality of components;
   identifying at least one set of associated sequential components of the functional block from the plurality of components of the netlist;
   identifying at least one set of associated combinational components of the functional block from the plurality of components of the netlist;
   assigning a coordinate value to each of the of the least one set of associated sequential components, the least one set of associated combinational components and a plurality of remaining components from the plurality of components of the netlist, the coordinate value indicative of a position in the footprint of the functional block relative to a fixed reference point;
   assigning a unique identifier to each of the at least one set of associated sequential components, the least one set of associated combinational components and a plurality of remaining components from the plurality of components of the netlist;
   creating a hypergraph containing the unique identifiers, the hypergraph indicative of the at least one connection between the pair of components of the plurality of components;
   organizing the plurality of components of the functional block into a plurality of rows based at least on the hypergraph within a footprint of the functional block; and
   utilizing the organized plurality of components to generate the functional block of the microelectronic circuit.

2. The method of claim 1 wherein the coordinate value indicates a vertical position in the footprint of the functional block relative to the fixed reference point.

3. The method of claim 2 further comprising:
   collecting components with similar coordinate values into at least one set of related components of the functional block.

4. The method of claim 3 further comprising:
   adding the at least one set of related components of the functional block as a row in the footprint of the functional block.

5. The method of claim 1 wherein the at least one set of associated sequential components of the functional block from the plurality of components of the netlist comprises a set of flip-flop components.

6. The method of claim 1 wherein the at least one set of associated combinational components of the functional block from the plurality of components of the netlist comprises a plurality of components interconnected with an enable signal input to the functional block.

7. The method of claim 1 wherein organizing the plurality of components of the functional block into a plurality of rows based at least on the hypergraph comprises placing the pair of components of the at least one connection in adjacent rows.

8. A design tool for the design of a microelectronic circuit, the design tool comprising:
   a computer-readable medium for storing a netlist, the netlist comprising a listing of a plurality of components of a functional block of a microelectronic circuit and a plurality of connections between the plurality of components;
   a processor configured to obtain one or more executable instructions from the computer-readable medium, wherein the processor executes the one or more instructions to perform the operations of:
      obtaining the netlist from the computer-readable medium;
      identifying at least one set of storage components of the functional block from the plurality of components of the netlist;
      identifying at least one set of associated combinational components of the functional block from the plurality of components of the netlist
      assigning a coordinate value to each of the at least one set of storage components, the least one set of associated combinational components and a plurality of remaining components from the plurality of components of the netlist, the coordinate value indicative of a vertical position in the footprint of the functional block relative to a fixed reference point;
      assigning a unique identifier to each of the at least one set of storage components, the least one set of associated combinational components and a plurality of remaining components from the plurality of components of the netlist;
      modifying the netlist into a hypergraph, the hypergraph comprising a plurality of entries associated with the plurality of connections utilizing the unique identifiers, wherein at least one entry comprises at least one pair of unique identifiers indicating a connection between the pair of unique identifiers; and
      locating the plurality of components of the functional block into a plurality of rows based at least on the plurality of connections in the hypergraph, the locating configured to place the components associated with the at least one pair of unique identifiers in adjacent rows.

9. The design tool of claim 8 wherein the at least one set of associated combinational components of the functional block comprises a carry chain adder circuit.

10. The design tool of claim 8 wherein the functional block of the microelectronic circuit is a datapath block.

11. The design tool of claim 8 wherein the microelectronic circuit is a multi-threaded processor.

12. The design tool of claim 8 wherein the processor performs the operations of:
    collecting components with similar coordinate values into at least one set of related components of the functional block; and
    adding the at least one set of related components of the functional block as a row in the footprint of the functional block.

13. A non-transitory computer readable medium encoded with instructions for designing a portion of a microelectronic circuit, the instructions executable by a processor, comprising
    receiving a netlist describing the circuit portion, the netlist comprising a listing of a plurality of components of the circuit portion and at least one connection between a pair of components of the plurality of components;
    assigning a coordinate value to each of the of the least one set of associated sequential components, the least one set of associated combinational components and a plurality of remaining components from the plurality of components of the netlist, the coordinate value indicative of a vertical position in the footprint of the circuit portion relative to a fixed reference point;

assigning a unique identifier to each of at least one set of associated sequential components of the circuit portion from the plurality of components of the netlist, at least one set of associated combinational components of the circuit portion from the plurality of components of the netlist and a plurality of remaining components from the plurality of components of the netlist;

creating a hypergraph containing the unique identifiers, the hypergraph indicative of the at least one connection between the pair of components of the plurality of components;

organizing the plurality of components of the circuit portion into a plurality of rows based at least on the hypergraph within a footprint of the circuit portion; and generating the functional block of the microelectronic circuit from the organized plurality of components.

14. The non-transitory computer readable medium of claim 13, wherein the instructions executable by the processor further comprise:

collecting components with similar coordinate values into at least one set of related components of the functional block; and adding the at least one set of related components of the circuit portion as a row in the footprint of the circuit portion.

15. The non-transitory computer readable medium of claim 13, wherein the at least one set of associated sequential components of the circuit portion from the plurality of components of the netlist comprises a set of flip-flop components.

16. The non-transitory computer readable medium of claim 13, wherein the at least one set of associated combinational components of the circuit portion from the plurality of components of the netlist comprises a plurality of components interconnected with an enable signal input to the functional block.

17. The non-transitory computer readable medium of claim 13, wherein the portion of the circuit is a datapath block of a multi-threaded processor.

* * * * *